United States Patent
Chen

(10) Patent No.: US 10,909,377 B2
(45) Date of Patent: Feb. 2, 2021

(54) TRACKING OBJECTS WITH MULTIPLE CUES

(71) Applicant: Baidu USA LLC, Sunnyvale, CA (US)

(72) Inventor: I-Kuei Chen, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 363 days.

(21) Appl. No.: 15/956,438

(22) Filed: Apr. 18, 2018

(65) Prior Publication Data

US 2019/0325223 A1    Oct. 24, 2019

(51) Int. Cl.
*G06K 9/00* (2006.01)
*G06T 7/246* (2017.01)
*B60R 11/04* (2006.01)
*G05D 1/00* (2006.01)

(52) U.S. Cl.
CPC .......... *G06K 9/00677* (2013.01); *B60R 11/04* (2013.01); *G05D 1/0088* (2013.01); *G06K 9/00771* (2013.01); *G06T 7/248* (2017.01); *G05D 2201/0213* (2013.01)

(58) Field of Classification Search
None
See application file for complete search history.

(56) References Cited

U.S. PATENT DOCUMENTS

2011/0085702 A1* 4/2011 Nevatia .................... G06K 9/03
                                                                                 382/103
2014/0085545 A1* 3/2014 Tu ........................ G06K 9/6292
                                                                                 348/659

FOREIGN PATENT DOCUMENTS

JP          2018045287       3/2018

* cited by examiner

*Primary Examiner* — Matthew C Bella
*Assistant Examiner* — Brian D Shin
(74) *Attorney, Agent, or Firm* — Womble Bond Dickinson (US) LLP

(57) ABSTRACT

In one embodiment, objects are tracked by calculating affinity scores with multiple cues in cascading stages. In each stage, affinity scores are calculated for currently detected objects based on a cue. The affinity scores are then fed into subsequent stages to inform subsequent calculations based on subsequent cues, where calculations can be skipped and resources saved. Object tracks are updated every frame, to assist in autonomous vehicle driving.

20 Claims, 11 Drawing Sheets

$$\begin{bmatrix} & D1 & D2 & D3 & D4 \\ T1 & a11 & a12 & a13 & a14 \\ T2 & a21 & a22 & a23 & a24 \\ T3 & a31 & a32 & a33 & a34 \end{bmatrix}$$

FIG. 5A

$$\begin{bmatrix} & D1 & D2 & D3 & D4 \\ T1 & .99 & .35 & .10 & .25 \\ T2 & .40 & .60 & .15 & .25 \\ T3 & .09 & .05 & .61 & .01 \end{bmatrix}$$

FIG. 5B

$$\begin{bmatrix} & D1 & D2 & D3 & D4 \\ T1 & - & - & - & - \\ T2 & - & .75 & .13 & .25 \\ T3 & - & .20 & .66 & - \end{bmatrix}$$

FIG. 5C

$$\begin{bmatrix} & D1 & D2 & D3 & D4 \\ T1 & 1 & 0 & 0 & 0 \\ T2 & 0 & .45 & .02 & .06 \\ T3 & 0 & .01 & .40 & 0 \end{bmatrix}$$

FIG. 5D

TRACKING OBJECTS WITH MULTIPLE CUES

TECHNICAL FIELD

Embodiments of the present disclosure relate generally to operating autonomous vehicles. More particularly, embodiments of the disclosure relate to tracking of objects with multiple cues.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

During autonomous driving, a vehicle can maintain, in electronic memory, tracked objects, for example, to avoid collisions. Objects, for example, other vehicles, large debris, trees and road signs, can have a speed, direction, acceleration, orientation, position, distance from the autonomous driving vehicle (ADV), and other useful information that can assist the ADV in making driving decisions to avoid collisions.

To determine object tracks, ADVs capture past and present image/data frames, for example, a series of images or video of objects around the vehicle. A present image frame is processed and compared to past frames or previously tracked objects, to match the objects in the present frame with object tracks that were previously determined. However, conventional methods and systems in ADVs process multiple cues independently without collaboration, which tend to be unreliable.

BRIEF DESCRIPTION OF THE DRAWINGS

Embodiments of the disclosure are illustrated by way of example and not limitation in the figures of the accompanying drawings in which like references indicate similar elements.

FIGS. 5A-5D are examples of affinity matrices according to certain embodiments.

DETAILED DESCRIPTION

Figure 1:
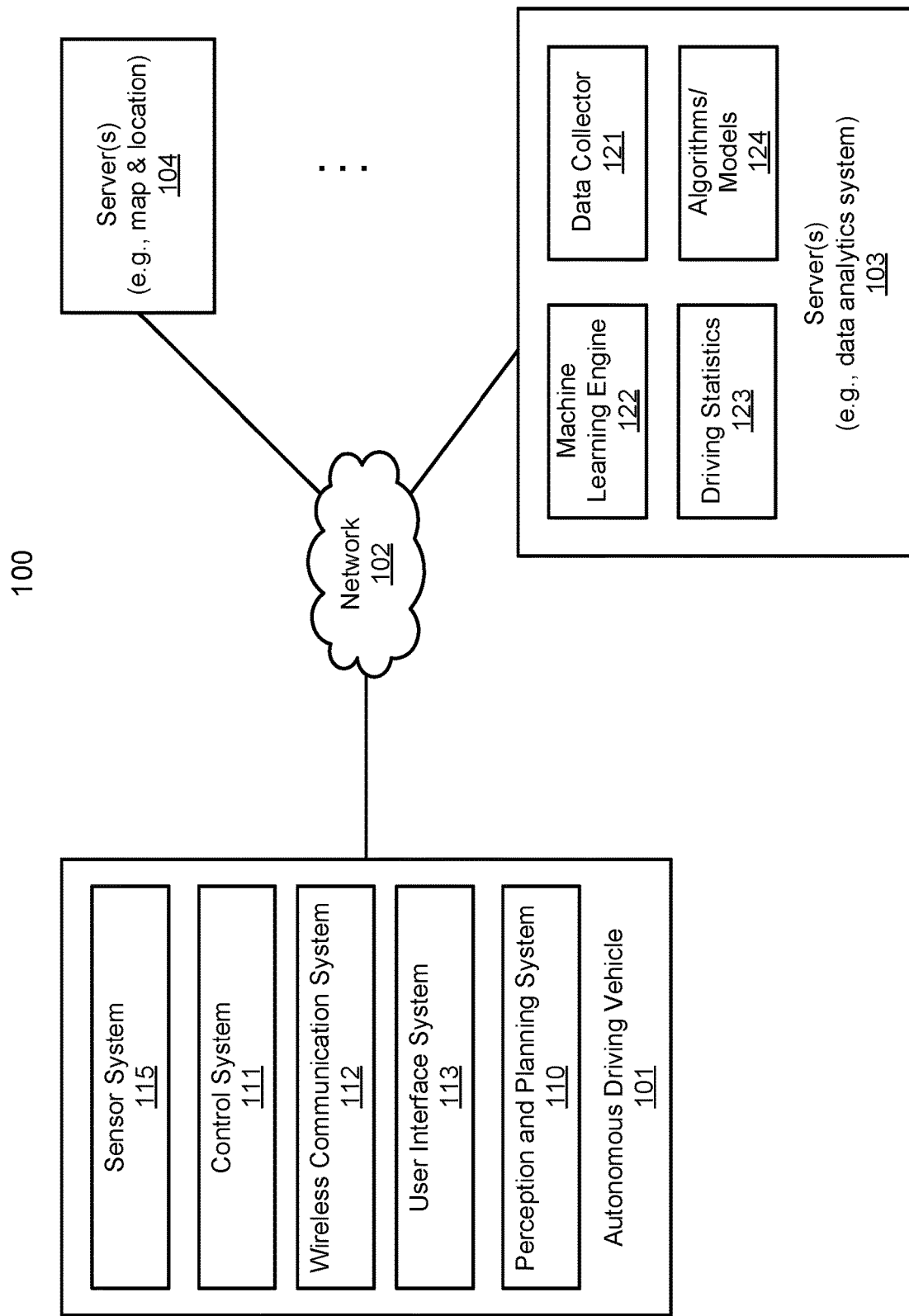
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments a computer-implemented method of tracking objects for an autonomous vehicle, includes calculating, based on a first cue, a first set of affinity scores between currently detected objects of a current frame and previously tracked objects of a previous frame; and modifying a set of progressive affinity scores with the first set of affinity scores; calculating, based on a subsequent cue, a subsequent set of affinity scores between the currently detected objects and the previously tracked objects; modifying the set of progressive affinity scores with the subsequent set of affinity scores; and associating one or more of the currently detected objects with one or more of the previously tracked objects as an identical object, based on the set of progressive affinity scores, to track movement of the identical object; wherein each affinity score is a calculation of similarity between one of the currently detected objects and one of the previously tracked objects. By performing stages in a cascaded manner (i.e. calculate a first set of affinity scores based on a first cue, then feeding a set of progressive affinity scores into the calculation of the next set of affinity scores) this provides for determining whether or not to skip an affinity score calculation or calculations, based on a previously calculated affinity score.

In one embodiment, determining whether or not to skip an affinity score calculation can include determining, based on a previously calculated affinity score, an impossible match between one or more of the currently detected objects and the one or more of the previously tracked objects; and modifying subsequent affinity score calculations, to skip calculations of the impossible match. Alternatively or additionally, determining whether or not to skip an affinity score calculation can includes determining, based on a previously calculated affinity score, a positive match between one or more of the currently detected objects and one or more of the previously tracked objects; and skipping calculations of the one or more currently detected objects and the one or more previously tracked objects where the positive match was determined.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
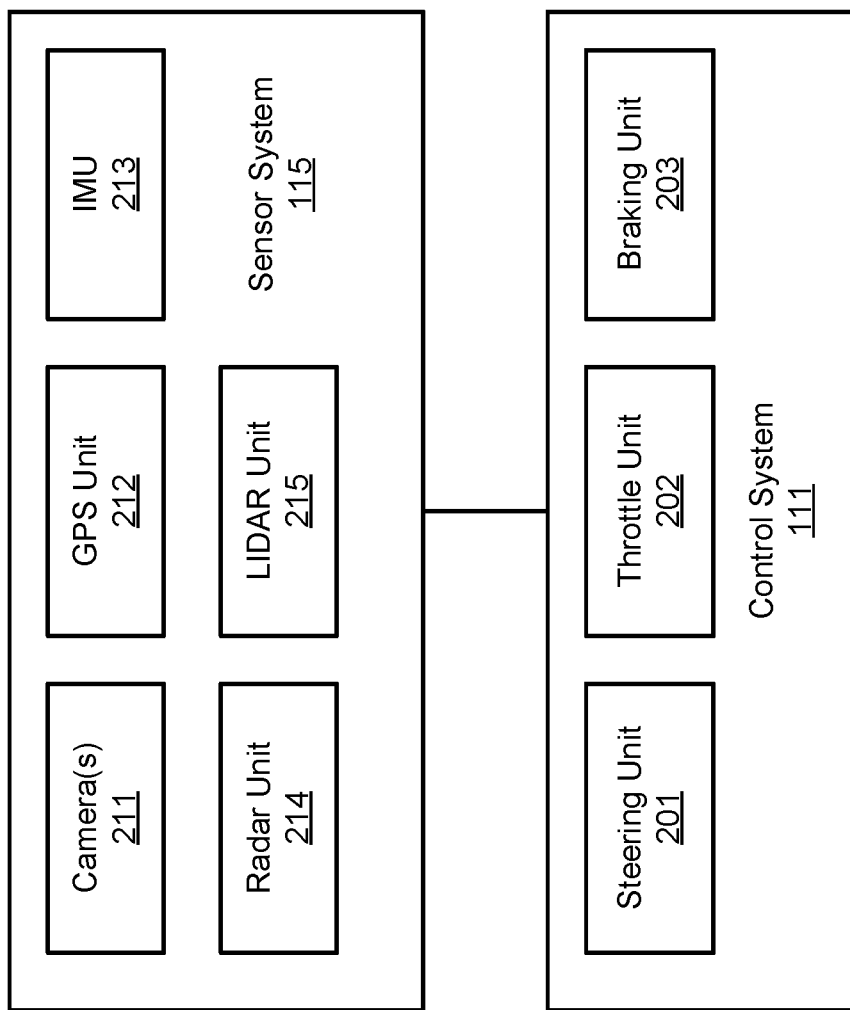
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. For example, algorithms 124 include algorithms calculating the affinity scores to track the obstacles from time to time. Algorithms 124 can then be uploaded onto ADVs for real-time autonomous driving.

Figure 3A:
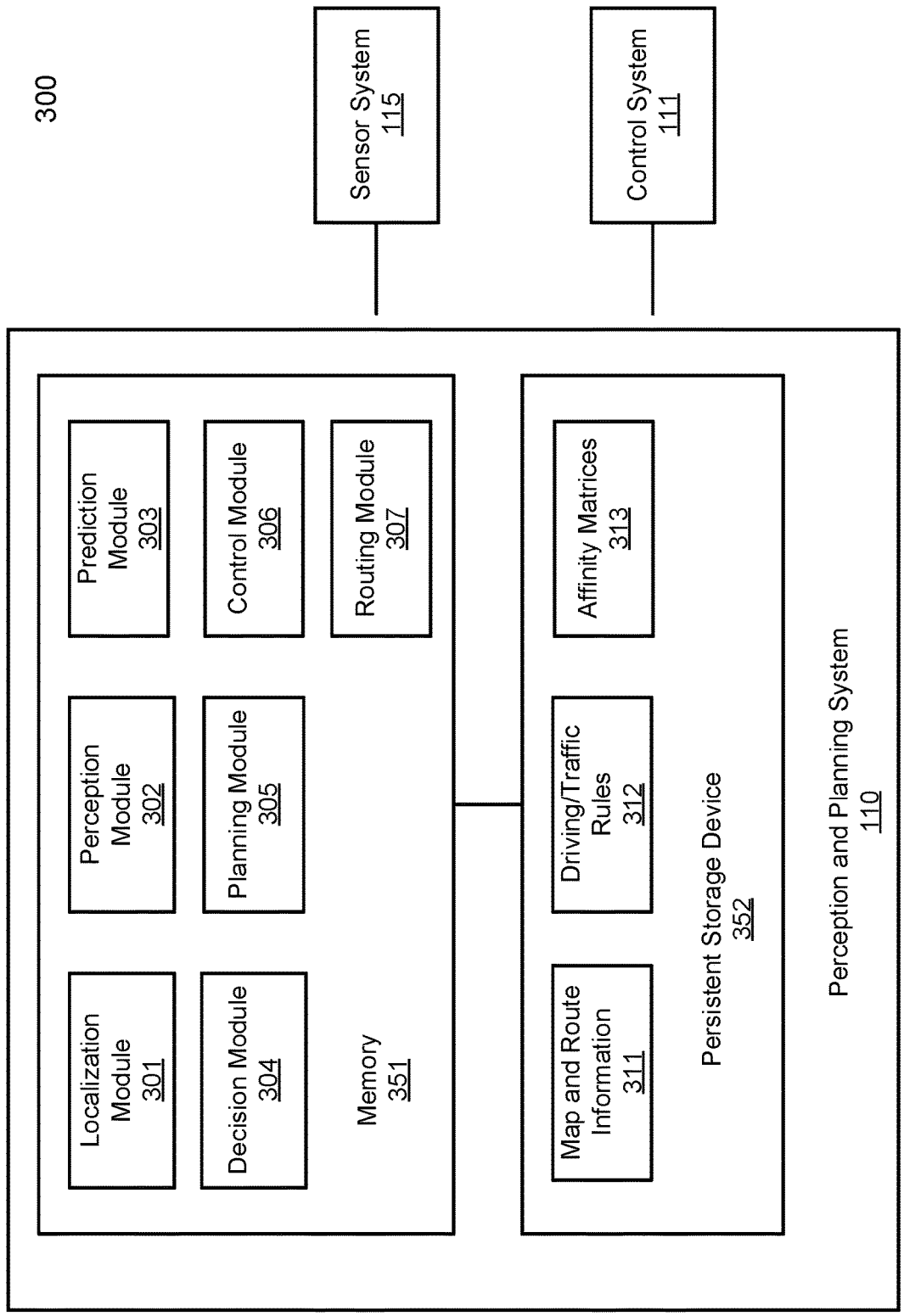
FIGS. 3A-3C are block diagrams illustrating an example of a perception and planning system used with an autonomous vehicle according to one embodiment.
Figure 3B:
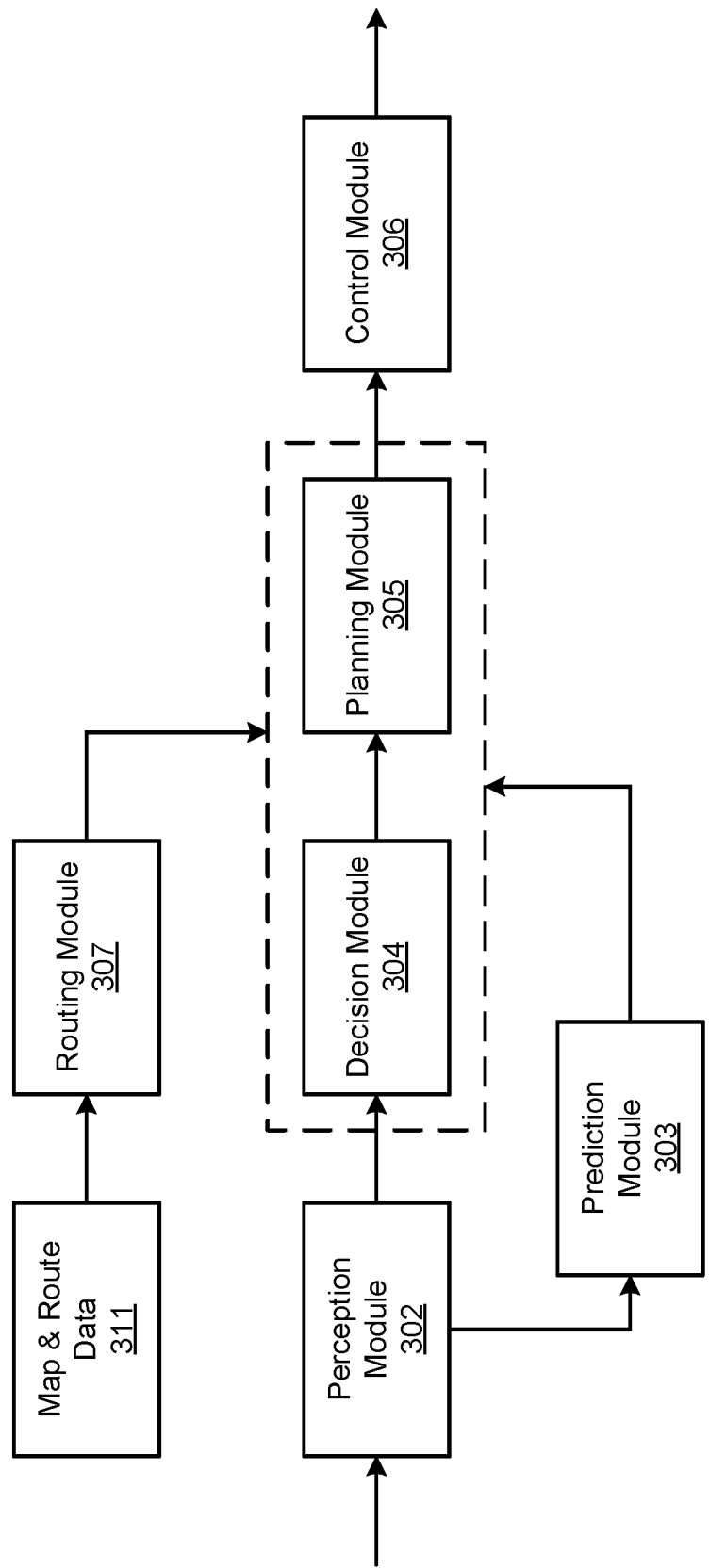

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307.

Some or all of modules 301-307 and related subcomponents may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal route in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Figure 3C:
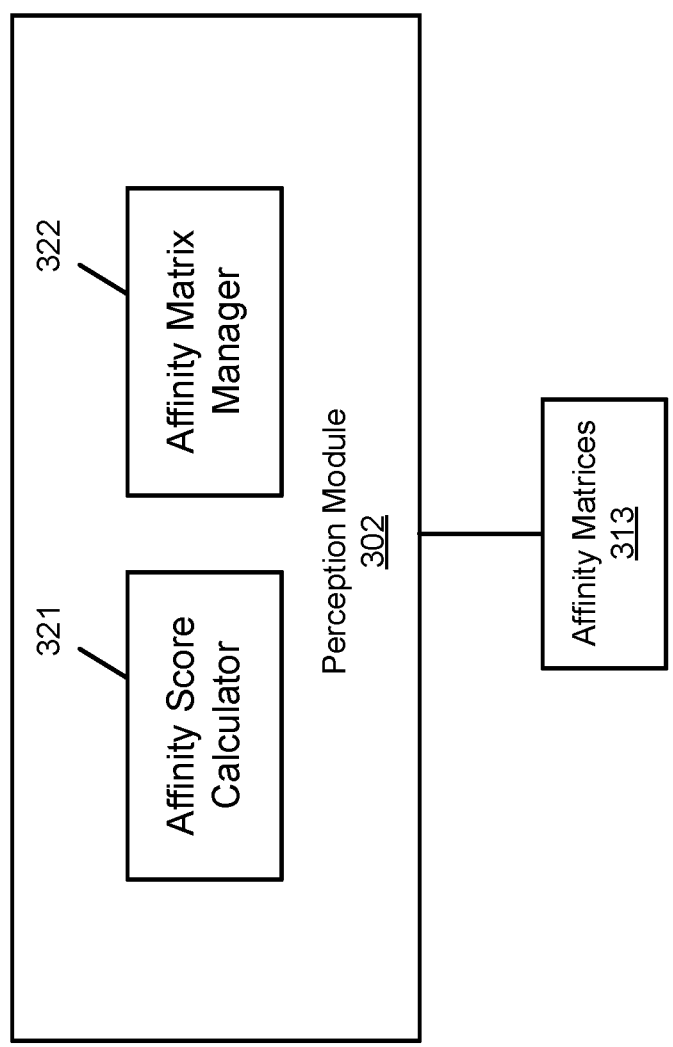

FIG. 3C illustrates subcomponents of the perception module 302 including an affinity score calculator 321 and an affinity matrix manager 322. In one embodiment, affinity score calculator 321 is configured to calculate an affinity score for a particular object detected in a current cycle based on a set of features extracted from a particular cue. Affinity matrix manager 322 is configured to update the affinity matrix carried from one stage or cue to another stage or cue, for example, by merging or integrating (e.g., multiplying, adding, subtracting, a predetermined formula) the affinity score with the existing scores stored in the affinity matrix. The affinity matrix is passed from one processing stage corresponding to one cue to a next processing stage corresponding to another cue. If the features extract from a cue of the same object from different cycles are similar, their corresponding affinity scores will be higher and the aggregated affinity score stored in the affinity matrix will also be higher. A higher affinity score carried in the affinity matrix represents higher probability that the currently detected object is the same or similar to a previously detected object. Thus, an affinity score represents a similarity between two objects detected in two different cycles, e.g., planning cycles.

Figure 4A:
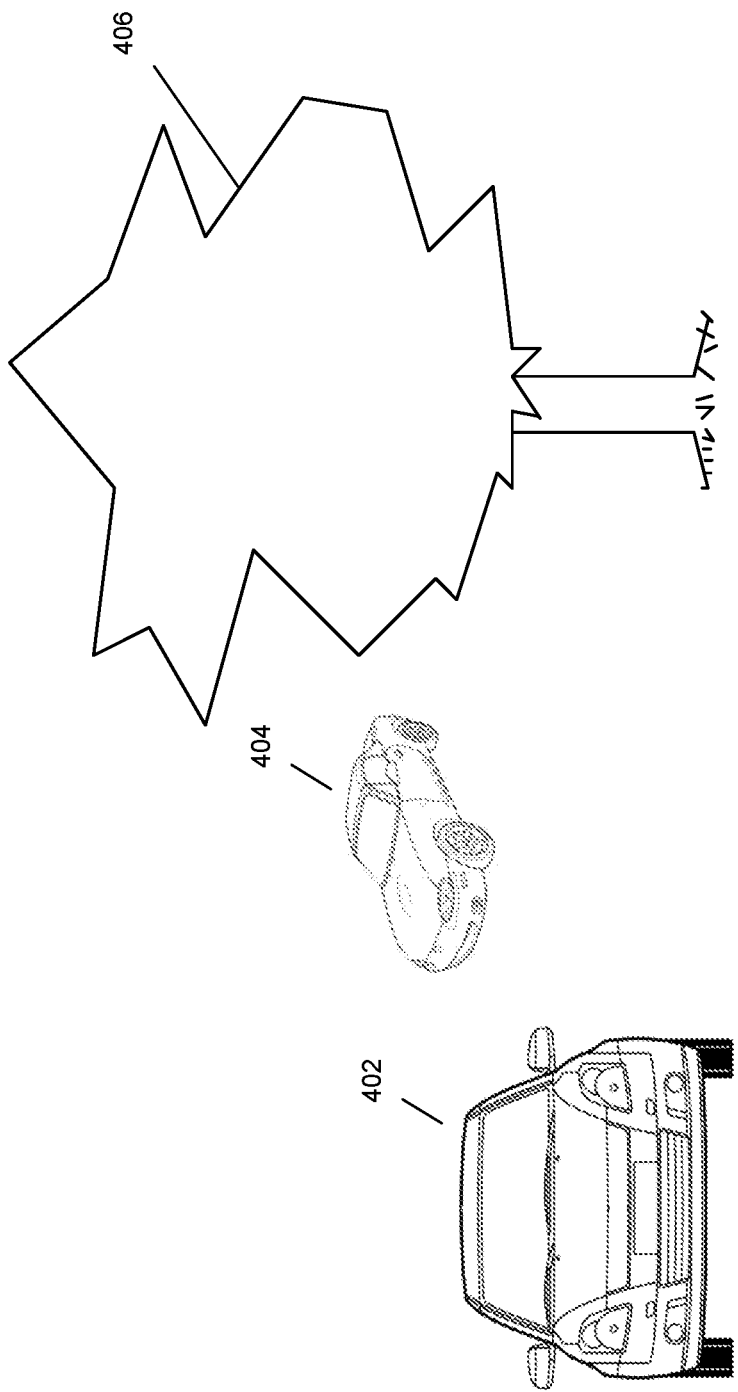
FIGS. 4A-4B are illustrate an example of tracked objects.
Figure 4B:
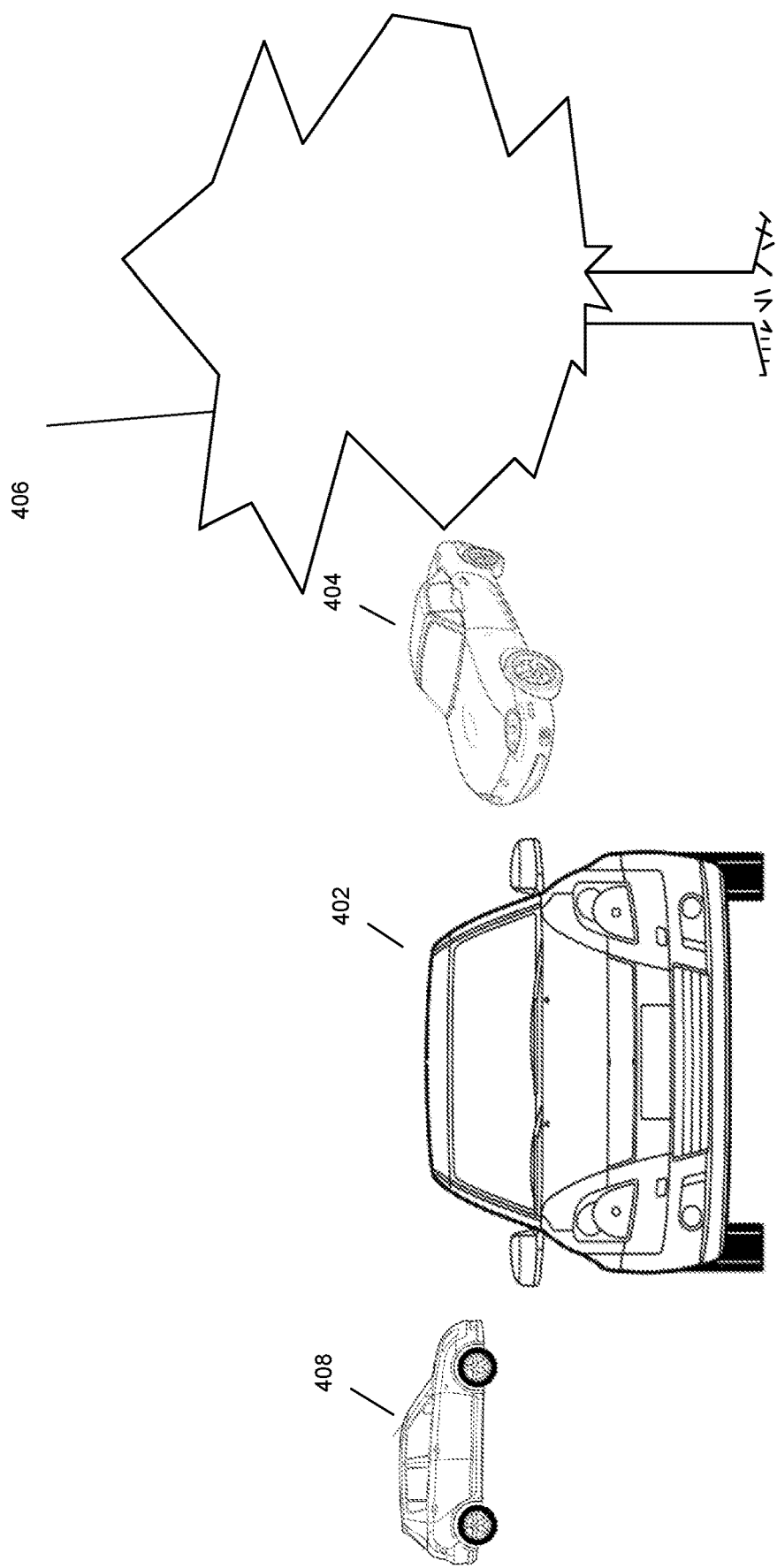

Regarding tracking objects with multiple cues, we refer to FIGS. 4A and 4B to illustrate the concept. The ADV's perception module can track objects based on various cues, including 2D image patches, 2D shapes, 2D box, 3D information, type, deep learning ROI similarity, optical flow, histogram, or specific features from machine learning or designs. Processing of each cue is performed to determine a similarity, or affinity, between a currently detected object and a previously tracked object. Previously tracked objects are maintained in computer memory and updated by processing a new frame of data. The new frame of data can be generated, for example, as a 2D image.

For example, FIG. 4A shows tracked objects from previously calculated frames. The system maintains tracking data of objects that are perceived to be in a region of interest with respect to the ADV, for example, an area in front of the ADV. In FIG. 4A, an example is shown that an object/car 402, an object/car 404 and an object/tree 406 are in a region of interest, with respect to the ADV.

The ADV can maintains tracks of these objects (tracks can include, for example, a size, a speed, a direction, a position, a distance from the ADV, a turning angle, an acceleration, and an orientation) to inform ADV driving decisions and prevent collisions. To maintain and update the tracks of the objects in real-time, a current frame is processed, and the detected objects in the current frame are matched to the previously tracked objects.

For example, FIG. 4B shows a subsequent frame where the car 402, the car 404, and the tree 406 appear to have moved closer because they grew slightly larger. In addition, a new object/car 408 has entered the frame. Although humans can match objects of the current frame to previously tracked objects rather easily, computers do so with less certainty. To improve computer matching capabilities, multiple cues are processed for each frame to match each detected object to a previously tracked object. In this case, the ADV system will attempt to match all the newly detected objects to the previously tracked objects, and update the tracking information. In addition, the ADV system may determine that a new object/car 408 has entered the region of interest, and create a new track based on the object/car 408.

Figure 6:
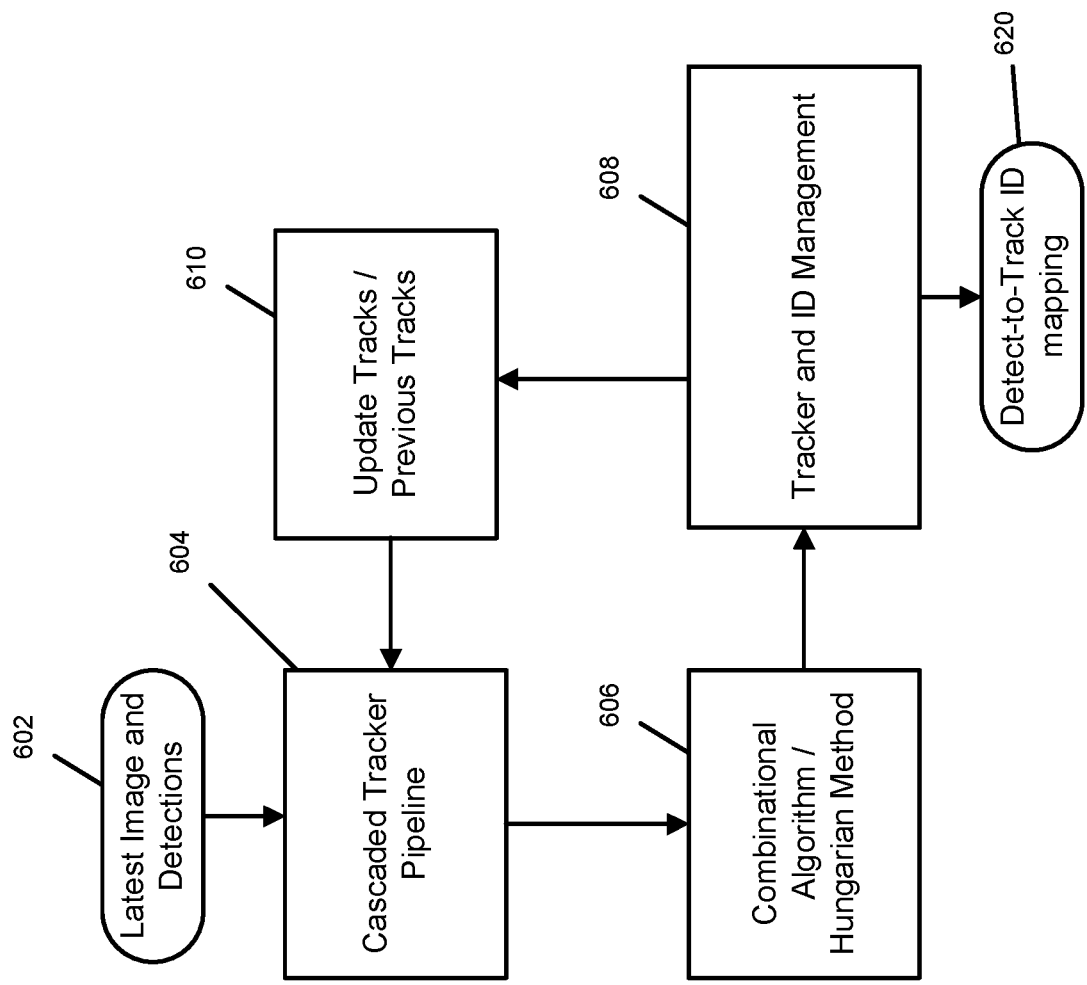
FIG. 6 is an example of a flow diagram for tracking objects according to one embodiment.

Referring now to FIG. 6, the ADV (perception module 302) can receive the latest image/frame and corresponding detections in operation 602 and process the latest image/frame and detections in a cascaded tracker pipeline in operation 604. Once all the cues are processed in the cascaded tracker pipeline, the perception module 302 can perform a combinational algorithm, for example, the Hungarian method in operation 606 on a final set of affinity calculations received from the cascaded tracker pipeline. The Hungarian method in operation 606 outputs a final relationship/association between the currently detected objects from the current frame and the tracks. The Hungarian method is a combinatorial optimization algorithm that solves the assignment problem in polynomial time. In this example, the Hungarian method is to assign a currently detected object to a previously detected object, or vice versa, such that they are considered related to each other (e.g., similar or identical).

For example, referring back to FIGS. 4A and 4B, the newly detected objects 402, 404, and 406 would be associated with tracks 402, 404, and 406, respectively. Newly detected object 408 would not be associated with any existing tracks. The Tracker ID and Management in operation 608 can then create a new track for object 408 and update tracks 402, 404, and 406, resulting in an output detect-to-track id mapping in operation 620 to be used by the ADV to make driving decisions. The updated tracks will then be used as previous tracks in operation 610 to process the next frame similarly.

Figure 7:
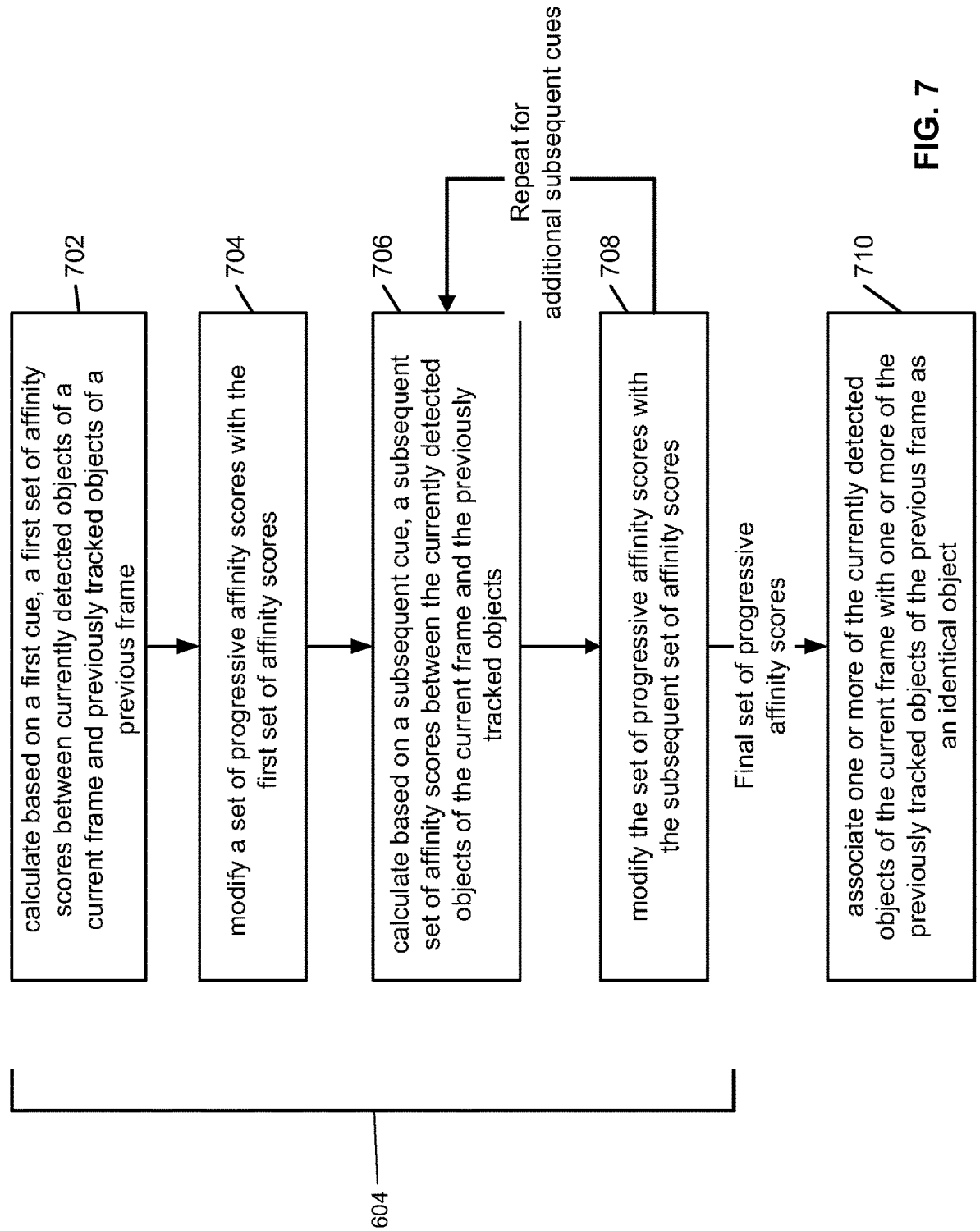
FIG. 7 is an example of a cascaded tracker pipeline according to one embodiment.

Referring now to FIG. 7, the cascaded tracker pipeline 604 can include various parts. For example, the system can calculate based on a first cue, a first set of affinity scores between currently detected objects of a current frame and previously tracked objects of a previous frame in operation 702. The affinity scores may be stored in a persistent storage device, for example, as a part of affinity matrices 313. Affinity score calculator 321 is configured to calculate an affinity score for a particular cue using a particular affinity scoring algorithm. Each cue may have a different scoring algorithm.

In one embodiment, for each of a set of predetermined cues (e.g., 3D position, 2D image patches, 2D boxes, ROI features, etc.), a set of features are extracted from an image capturing an object. An affinity score is then calculated based on the extracted features of the corresponding cue.

Next, the system can modify a set of progressive affinity scores with the first set of affinity scores in operation 704. The affinity scores can be modified and maintained in an affinity matrix. For example, referring to FIG. 5A, the affinity matrix can have m rows, each row representing a tracked object (T1, T2 and T3), and n columns, each column representing a detected object (D1, D2, D3, and D4) in the current frame. Each element of the affinity matrix (a11, a12 . . . a34) corresponds to a similarity between one of the detected objects and one of the tracked objects. Thus, the affinity matrix accumulates the affinity scores from the history of the affinity scores.

Referring back to FIG. 7, the system can calculate based on a subsequent cue, a subsequent set of affinity scores between the currently detected objects of the current frame and the previously tracked objects in operation 706. Advantageously and beneficially, for each subsequent cue calculation or set of calculations, the system can determine whether or not to skip an affinity score calculation, based on a previously calculated affinity score.

For example, the system can determine, based on a previously calculated affinity score (for example, from a previous stage/cue), an impossible match between one or more of the currently detected objects and the one or more of the previously tracked objects; and modify subsequent affinity score calculations, to skip calculations of the impossible match. Alternatively, if the difference between a currently detected object and a previously detected object exceeds a predetermined threshold, it is unlikely these two objects are the same object. Thus, subsequent calculations of the affinity scores between these two objects may be skipped to reduce resource consumption. Similarly, if the affinity score between two objects in the affinity matrix is above a predetermined threshold, it is very likely these objects are the same object. Thus, the subsequent calculation can also be skipped. The goal of calculating affinity scores is to determine whether two objects are the same objects. If it is already known based on the accumulated affinity score that a particular pair of objects refer to the same object or cannot be the same object, there is no need to perform any affinity score calculation further.

Similarly, the system can determine, based on a previously calculated affinity score (for example, from a previous stage/cue), a positive match between one or more of the currently detected objects and one or more of the previously tracked objects; and skip calculations of the one or more currently detected objects and the one or more previously tracked objects where the positive match was determined. A positive match can include highly probably matches, and can be determined, for example, when an affinity score exceeds a threshold value. Similarly, a negative, or impossible match, can include highly improbable matches, and can be determined, for example, when a threshold value has been exceeded or has not been exceeded. Determinations of threshold values can be made by one skilled in the art based on routine experimentation.

Referring now to FIGS. 5B and 5C, an example is shown for further illustration where an affinity score is calculated for D4 and T3 to be 0.01. The system can determine that, based on the low value of 0.01, D4 cannot be a match with T3. The system can skip affinity calculations between D4 and T3 in subsequent stages. Accordingly, in FIG. 5C, the system did not calculate an affinity score for D4/T3 (shown as a dash) because it was determined (for example, based on an affinity calculation from the previous stage) to be an impossible match to save resources.

Similarly, FIG. 5B shows a high affinity, 0.99, between D1 and T1. Therefore, in subsequent stages, affinity calculations can be skipped for all combinations involving D1 and T1, thereby also saving valuable resources.

FIGS. 5B-5C are merely hypothetical affinity matrices used to illustrate the various concepts, however, the embodiments, nomenclature, and values do not limit the disclosures provided herein. For example, FIG. 5D shows an embodiment where, when a high probability has been calculated for D1 and T1, the corresponding affinity score in the affinity matrix can be set to 1 while all other combinations relating to D1 and T1 can be set to 0. When subsequent stages are performed, the system can skip over any values that are set to 0 or 1. Although this is but one technique, it is also possible to perform the task of skipping calculations in different but equivalent ways, such as by setting flags, or other techniques capable of being implemented by one skilled in the art. Similarly, although calculated values are shown as having a range from 0 to 1, other embodiments can have a different range, normalized with regard to each other or the particular application.

Next, the system can modify the set of progressive affinity scores with the subsequent set of affinity scores in operation 708. For example, the system can multiply each progressive affinity score with a corresponding calculated affinity score (based on a corresponding subsequent cue).

To illustrate, assuming that an affinity matrix is first generated, with the value 1 in every matrix element. Assume that first set of affinity scores is calculated based on a first cue, then each of the affinity scores is multiplied against a corresponding element in the progressive affinity scores kept in the affinity matrix. In the first case, each score of the first set of affinity scores is multiplied against 1, resulting in the progressive affinity scores in FIG. 5B. In addition, different cues can be assigned different weights based on their accuracy or on dynamic conditions.

Next, a second set of affinity scores is calculated (as shown in FIG. 5C) and multiplied again with the progressive affinity scores, resulting in an updated/modified set of progressive affinity scores, as shown in FIG. 5D. Referring back to FIG. 7, if all the cues have been processed (i.e. if all stages are performed), the progressive affinity scores can represent a final set of progressive affinity scores. If more cues are to be processed, then operations 706 and 708 can be repeated for each additional cue/stage.

Next, the system can associate one or more of the currently detected objects of the current frame with one or more of the previously tracked objects of the previous frame as an identical object. For example, the system uses the final set of progressive scores to determine which of the currently detected objects match the existing tracks (i.e. the previously tracked objects). The system can perform a combinatorial optimization algorithm, for example, the Hungarian method, on the final set of progressive scores, which can result in final association or assignment between the currently detected objects and the previously tracked objects.

The system can then update the previously tracked objects, or tracks (including, for example, position, distance from ADV, speed, direction, and acceleration), with information from the currently detected objects. With the updated tracks, the system can then process a new frame with the multiple cues in the cascaded manner as described above.

In one embodiment, an order of cue processing, or stages, can be determined based on an accuracy of a cue, for example, where the cues with higher accuracy are calculated before cues with lower accuracy. The accuracy of different cues can be determined through routine experimentation. Beneficially, by performing the most accurate cues first, the system can make the most accurate determinations of positive or negative (impossible) matches early on, and, as a result, skip calculations accurately at early stages.

In another embodiment, determining an order of cue processing, or stages, can be determined based on a speed of a cue processing, wherein cues with shorter processing time are calculated before cues with longer processing time. The speed of cue processing can be determined through routine experimentation or monitoring. Beneficially, by performing the fastest stages first, the system can quickly make determinations of positive or negative (impossible) matches in the quickest manner, thereby skipping calculations in the earliest stages.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
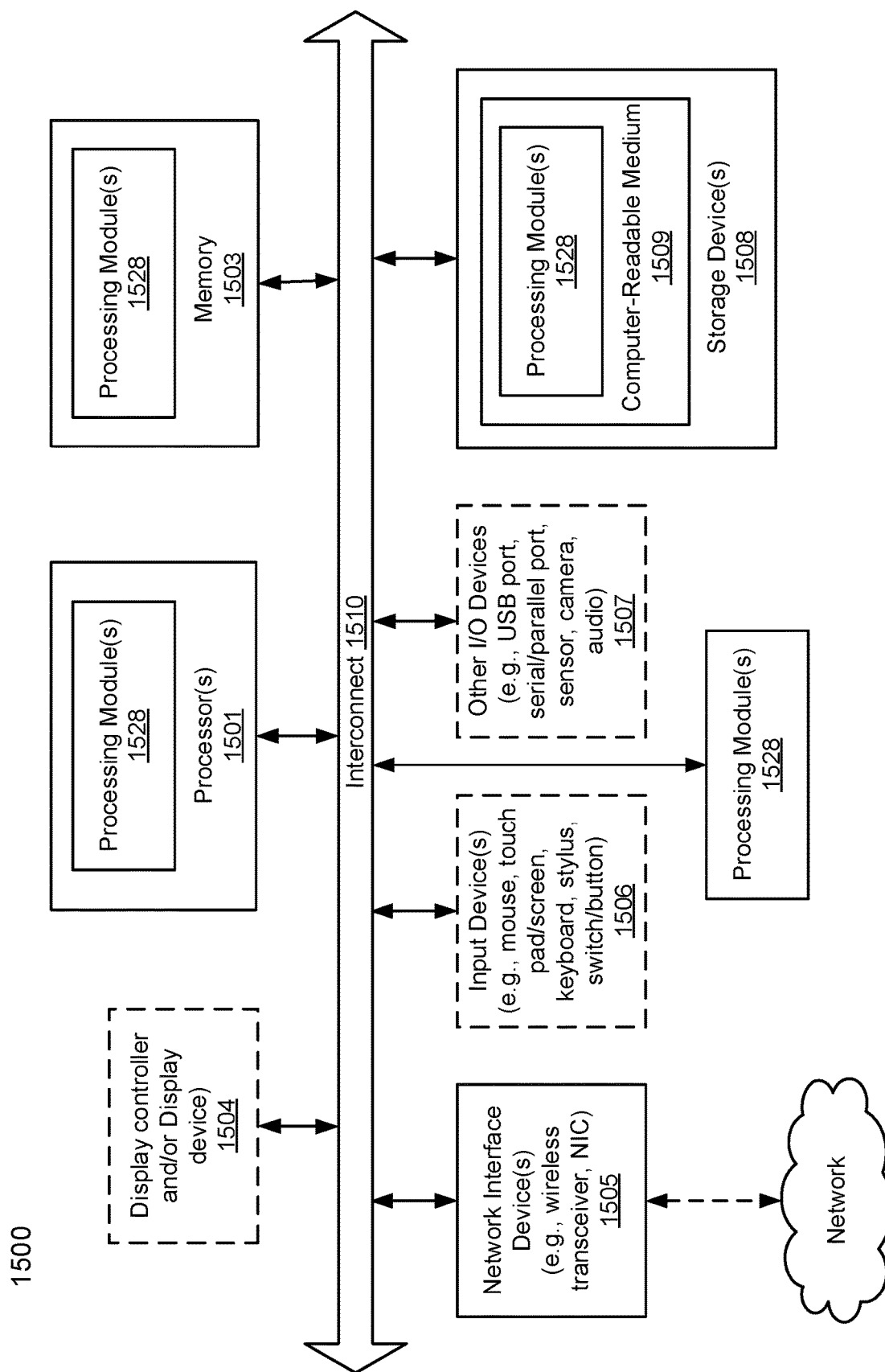
FIG. 8 is a block diagram illustrating a data processing system according to one embodiment.

FIG. 8 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein.

Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, perception module 302 and related subcomponents. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of tracking objects for an autonomous driving vehicle, the comprising:
    calculating, based on a first cue, a first set of affinity scores between currently detected objects of a current frame and previously tracked objects of a previous frame;
    modifying a set of progressive affinity scores based on the first set of affinity scores;
    calculating, based on a subsequent cue, a subsequent set of affinity scores between the currently detected objects and the previously tracked objects, wherein calculating the subsequent affinity scores includes determining whether or not to skip an affinity score calculation, based on the first set of affinity scores;
    modifying the set of progressive affinity scores with the subsequent set of affinity scores; and
    associating one or more of the currently detected objects with one or more of the previously tracked objects as an identical object, based on the set of progressive affinity scores, to track movement of the identical object, wherein each affinity score is a calculation of similarity between one of the currently detected objects and one of the previously tracked objects determined based on a machine learning algorithm and feature extraction.

2. The method according to claim 1, wherein the determination of whether or not to skip an affinity score calculation is based on a difference between a currently calculated affinity score and a previously calculated affinity score.

3. The method according to claim 1, wherein determining whether or not to skip an affinity score calculation comprises:
    determining, based on a previously calculated affinity score, an impossible match between one or more of the currently detected objects and the one or more of the previously tracked objects; and
    modifying subsequent affinity score calculations, to skip calculations of the impossible match.

4. The method according to claim 1, wherein the determining whether or not to skip an affinity score calculation comprises:
    determining, based on a previously calculated affinity score, a positive match between one or more of the currently detected objects and one or more of the previously tracked objects; and
    skipping calculations of the one or more currently detected objects and the one or more previously tracked objects where the positive match was determined.

5. The method according to claim 1, further comprising determining an order of cue processing based on an accuracy of a cue, wherein cues with higher accuracy are calculated before cues with lower accuracy.

6. The method according to claim 1, further comprising determining an order of cue processing based on a speed of a cue processing, wherein cues with shorter processing time are calculated before cues with longer processing time.

7. The method according to claim 1, wherein the first cue and subsequent cues are selected from the group consisting of 2D image patches, 2D shapes, 2D box, 3D information, type, deep ROI similarity, optical flow and histogram.

8. The method according to claim 1, wherein the set of progressive affinity scores are modified and maintained in an affinity matrix, and wherein associating one or more of the currently detected objects of the current frame with one or more of the previously tracked objects comprises performing a Hungarian method on a final set of progressive affinity scores, resulting in a final association between the currently detected objects and the previously tracked objects.

9. The method according to claim 8, further comprising updating the previously tracked objects based on information associated with the currently detected objects.

10. A non-transitory machine-readable medium having instructions stored therein, which when executed by a processor, cause the processor to perform operations, the operations comprising:
    calculating, based on a first cue, a first set of affinity scores between currently detected objects of a current frame and previously tracked objects of a previous frame;
    modifying a set of progressive affinity scores with the first set of affinity scores;
    calculating, based on a subsequent cue, a subsequent set of affinity scores between the currently detected objects and the previously tracked objects, wherein calculating the subsequent affinity scores includes determining whether or not to skip an affinity score calculation, based on the first set of affinity scores;
    modifying the set of progressive affinity scores with the subsequent set of affinity scores; and
    associating one or more of the currently detected objects with one or more of the previously tracked objects as an identical object, based on the set of progressive affinity scores, to track movement of the identical object, wherein each affinity score is a calculation of similarity between one of the currently detected objects and one of the previously tracked objects determined based on a machine learning algorithm and feature extraction.

11. The non-transitory machine-readable medium according to claim 10, wherein the determination of whether or not to skip an affinity score calculation is based on a difference between a currently calculated affinity score and a previously calculated affinity score.

12. The non-transitory machine-readable medium according to claim 10, wherein determining whether or not to skip an affinity score calculation comprises:
    determining, based on a previously calculated affinity score, an impossible match between one or more of the currently detected objects and the one or more of the previously tracked objects; and
    modifying subsequent affinity score calculations, to skip calculations of the impossible match.

13. The non-transitory machine-readable medium according to claim 10, wherein determining whether or not to skip an affinity score calculation comprises:
    determining, based on a previously calculated affinity score, a positive match between one or more of the currently detected objects and one or more of the previously tracked objects; and
    skipping calculations of the one or more currently detected objects and the one or more previously tracked objects where the positive match was determined.

14. The non-transitory machine-readable medium according to claim 10, wherein an order of cue processing is based on an accuracy of a cue, such that cues with higher accuracy are processed before cues with lower accuracy.

15. The non-transitory machine-readable medium according to claim 10, wherein an order of cue processing is based on a speed of a cue processing, such that cues with shorter processing time are calculated before cues with longer processing time.

16. The non-transitory machine-readable medium according to claim 10, wherein the first cue and subsequent cues are selected from the group consisting of 2D image patches, 2D shapes, 2D box, 3D information, type, deep ROI similarity, optical flow and histogram.

17. The non-transitory machine-readable medium according to claim 10, wherein the set of progressive affinity scores are modified and maintained in an affinity matrix, and wherein associating one or more of the currently detected objects of the current frame with one or more of the previously tracked objects comprises performing a Hungarian method on a final set of progressive affinity scores, resulting in a final association between the currently detected objects and the previously tracked objects.

18. The non-transitory machine-readable medium according to claim 17, wherein the operations further comprise updating the previously tracked objects with information from the currently detected objects.

19. A data processing system, comprising:
    a processor; and
    a memory coupled to the processor to store instructions, which when executed by the processor, cause the processor to perform operations, the operations including calculating, based on a first cue, a first set of affinity scores between currently detected objects of a current frame and previously tracked objects of a previous frame,
    modifying a set of progressive affinity scores with the first set of affinity scores,
    calculating, based on a subsequent cue, a subsequent set of affinity scores between the currently detected objects and the previously tracked objects,
    wherein calculating the subsequent affinity scores includes determining whether or not to skip an affinity score calculation, based on the first set of affinity scores,
    modifying the set of progressive affinity scores with the subsequent set of affinity scores, and
    associating one or more of the currently detected objects with one or more of the previously tracked objects as an identical object, based on the set of progressive affinity scores, to track movement of the identical object, wherein each affinity score is a calculation of similarity between one of the currently detected objects and one of the previously tracked objects determined based on a machine learning algorithm and feature extraction.

20. The data processing system according to claim 19, wherein the determination of whether or not to skip an affinity score calculation is based on a difference between a currently calculated affinity score and a previously calculated affinity score.

\* \* \* \* \*